Aug. 19, 1941.  P. CROSLEY, JR., ET AL  2,253,479
MOTOR VEHICLE
Filed Feb. 29, 1940  3 Sheets-Sheet 1
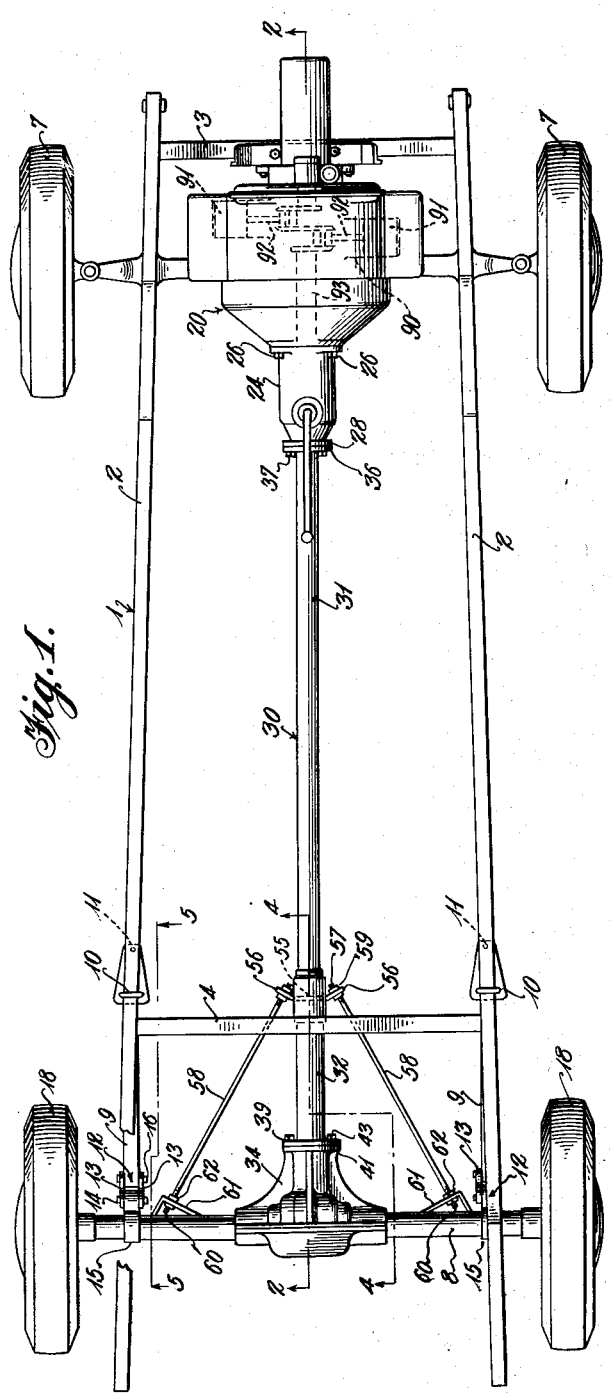
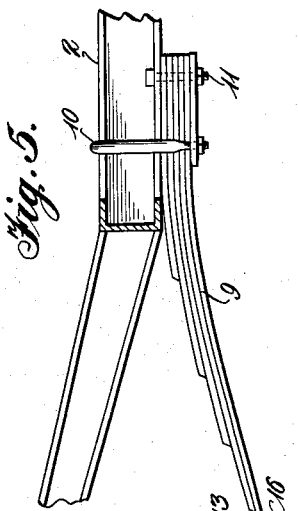
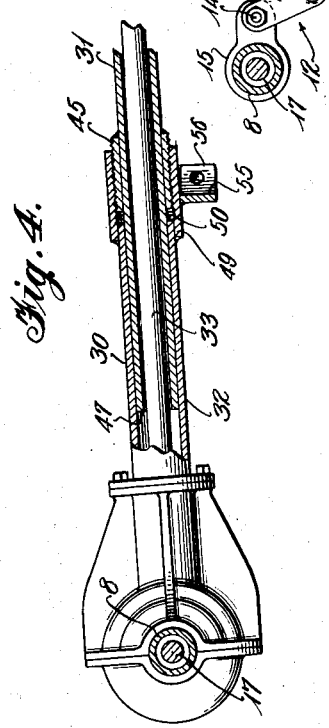
Inventors
Powel Crosley, Jr.
and Louis C. Oswald
By Bacon + Thomas
Attorneys Aug. 19, 1941.   P. CROSLEY, JR., ET AL   2,253,479
MOTOR VEHICLE
Filed Feb. 29, 1940   3 Sheets-Sheet 2
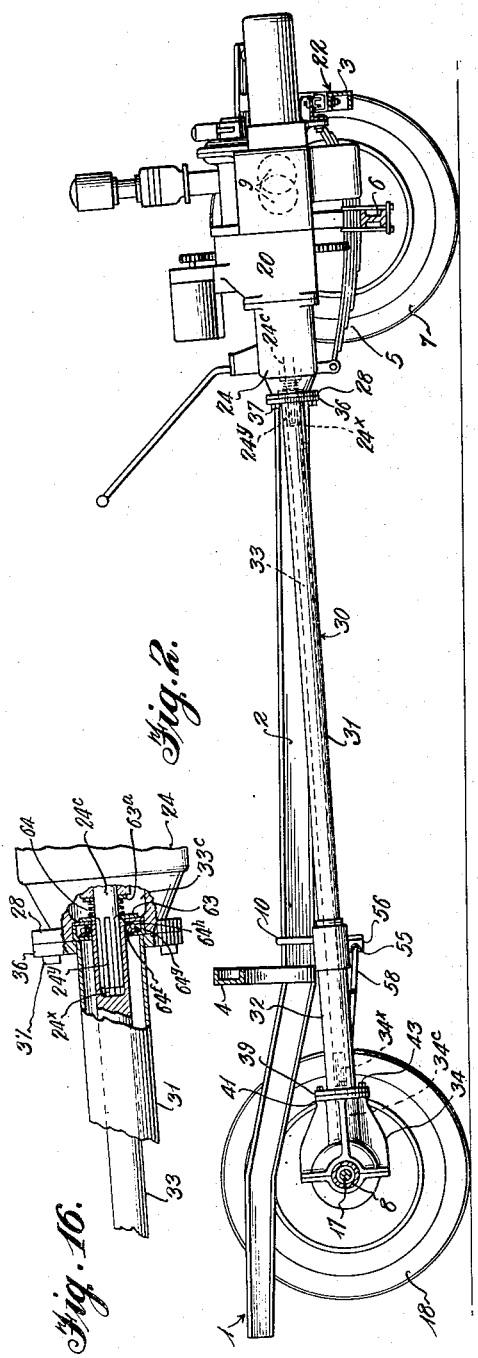
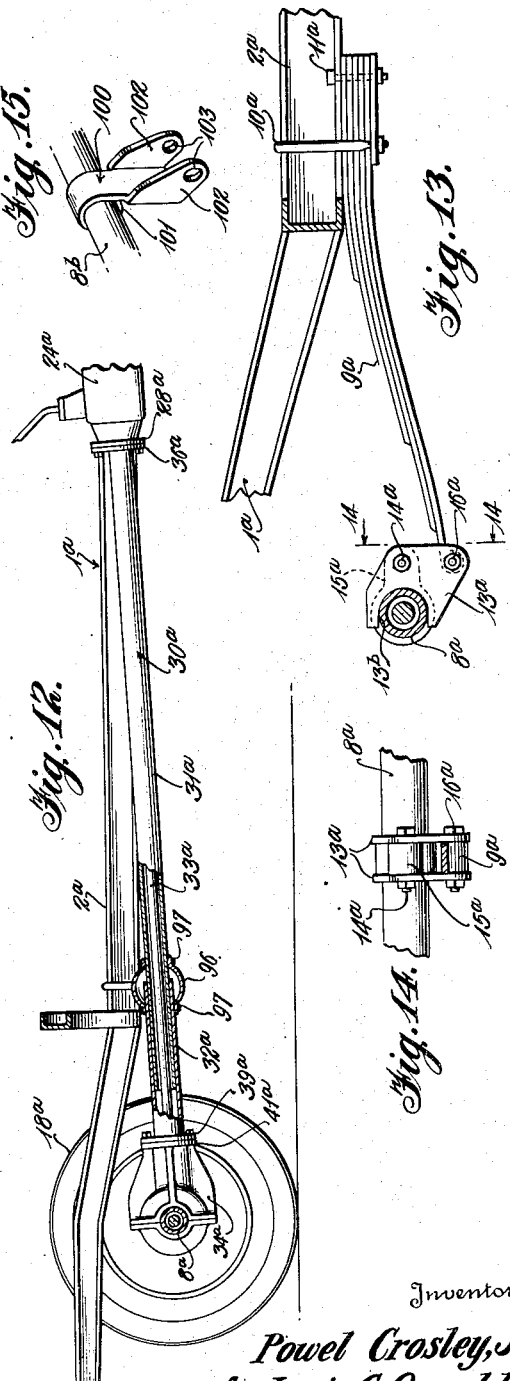
Inventors
Powel Crosley, Jr.
and Louis C. Oswald
By Bacon & Thomas
Attorneys Aug. 19, 1941.    P. CROSLEY, JR., ET AL    2,253,479
MOTOR VEHICLE
Filed Feb. 29, 1940    3 Sheets-Sheet 3
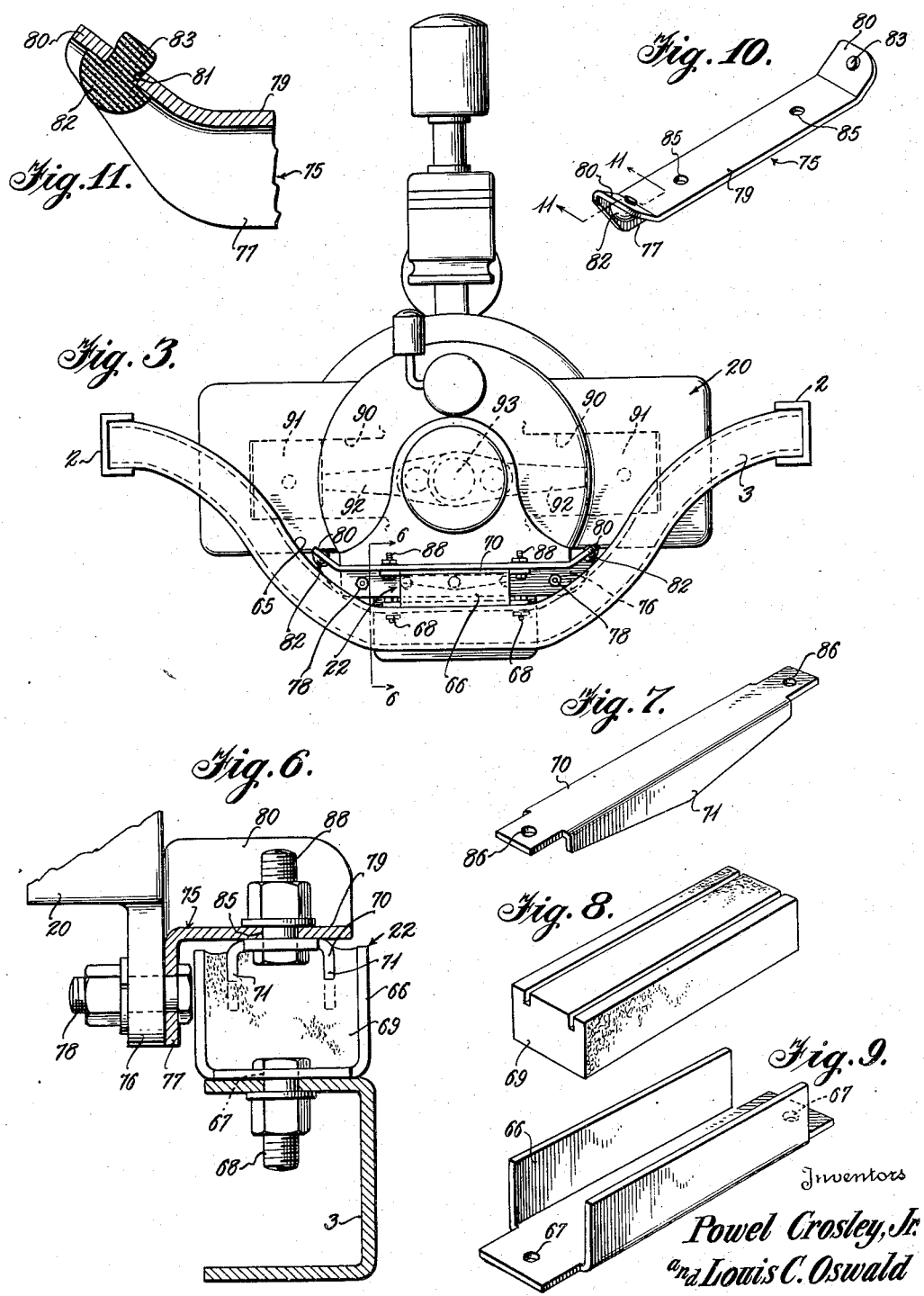

Patented Aug. 19, 1941

2,253,479

UNITED STATES PATENT OFFICE 2,253,479

MOTOR VEHICLE

Powel Crosley, Jr., and Louis C. Oswald, Cincinnati, Ohio, assignors to The Crosley Corporation, Cincinnati, Ohio, a corporation of Ohio Application February 29, 1940, Serial No. 321,588

4 Claims. (Cl. 180—57)

This invention relates to motor vehicles, and more particularly to drive means, engine supports, and suspensions for vehicles.

More specifically, the invention relates to supporting and suspension means for the engines of motor vehicles and may be exemplified by reference to a vehicle utilizing an engine having horizontal, opposed cylinders offset longitudinally of the engine crankshaft.

It has been found in actual practice that such an engine produces reactions and vibration characteristics different from those encountered with the more or less conventional V-type engines, or engines in which the cylinders are "in line," and that, therefore, the vibration problems to be overcome are necessarily different. This is particularly the case with a small light motor vehicle. Various driving and mounting means have been tried with an engine of the above type and found to be unsatisfactory. For example, where the engine was mounted on a resilient support adjacent its front end and the driving structure consisted of a rigid connection between the transmission housing, the propeller shaft housing and the rear axle housing designed so that the entire housing structure was integrally connected, an excessive vibration was transmitted through the engine mounting to the frame of the car particularly at certain speeds. Moreover, such a rigid structure was found to transmit to the frame undue shocks caused by the wheels running over rough portions of the roadway. The use of such a rigid housing structure disclosed, furthermore, that changes in the relative elevation of the rear wheels or the tendency of the engine to twist with respect to the propeller shaft housing placed excessive strains on the propeller shaft and its housing and caused the latter to break or shear away from its flanged connection with the transmission housing.

Again, with the use of a conventional type of universal joint between the transmission and the propeller shaft and with the engine supported on rubber at three points, one at the front and one at either side at the rear in accordance with common practice, it was found that if these supports were made relatively rigid or substantially non-resilient, excessive vibration was also transmitted from the engine to the frame of the car. In another instance, when the supports were made relatively soft the vibration of the engine at certain speeds was so great that the engine was caused to move about excessively relative to the frame and to throw the gear shaft lever into violent vibration.

Obviously none of these conditions can be tolerated in practice. On the other hand and in contrast, the present invention constitutes a satisfactory solution of the vibration problems presented by an engine of the type mentioned above.

An important feature of the present invention is the avoidance of unsatisfactory known or conventional types of connection between the transmission shaft and the propeller shaft and their housings, with the avoidance of torsional, vibrational or other strains thereon.

Another important feature of the invention which contributes to smooth operation is the unique mounting of the engine and its connection with the transmission housing, propeller shaft housing and rear axle housing to form a unitary assembly adapted not only to pivot to a limited extent about said mounting in a vertical plane through the axis of the aligned shafts but also to permit relative rotatable movement between the front and rear parts of said assembly. These features include the control of the oscillatory force created by the engine and the elimination of shocks originating from the ridges and hollows of the roadway. Incidentally, such features afford the important advantage of low cost manufacture.

One practical embodiment of the invention comprises an assembly as described above, associated with a frame so that the forward end of the engine is resiliently supported at one point on a transverse frame member and restrained from substantial oscillation relative to said member. In this embodiment, the propeller shaft housing is made of telescoping tubular sections stiff enough to resist bending and transmit a driving thrust, the sections being threaded together to provide a rotatable joint capable of transmitting longitudinal thrust but which will permit the rear driving wheels to freely pivot with respect to the frame and/or the engine in accordance with variations in road level without setting up any torsional stress in the propeller shaft housing itself or imposing shearing stress on the means connecting the sections of said propeller shaft housing to the transmission and rear. The threaded connection between the sections of the propeller shaft housing inherently makes said housing adjustable to various lengths, within limits of course. When a rotatable joint of the type described is incorporated in the propeller shaft housing of the unit, cantilever leaf springs are used to resiliently support the rear portion of the frame above the rear axle housing; one end of each of these springs is preferably connected with the rear axle housing by a free swinging shackle, the other end of each of said springs being fixedly secured to the frame. In this manner, the driving thrust of the rear wheels is transmitted to the frame, not through the cantilever springs but through the rear housing, the propeller shaft housing, the transmission housing, the engine, and finally, through the resilient engine support at the front of the frame.

Another practical embodiment of the invention comprises the assembly of the engine, transmission, propeller shaft housing, and rear housing as a unit as above described, but instead of providing the propeller shaft housing with a rotatable joint capable of transmitting longitudinal thrust, the propeller shaft housing is made of a plurality of telescoping sections forming at their overlapped portions a joint incapable of transmitting longitudinal thrust that we may characterize as both rotatable and slidable, and provides for free, relative longitudinal sliding movement of the sections of the propeller shaft housing, while at the same time permitting relative rotation of the sections of the housing to take care of irregularities in the road surface traversed by the rear wheels. When such type of propeller shaft housing is employed, the swinging shackles are omitted and one end of each of the cantilever springs at the rear of the vehicle is pivotally secured to the rear axle housing, and the other end of each of the springs is rigidly secured to the frame in any suitable manner. This arrangement permits the direct transmission of driving thrust from the rear axle housing to the frame through the springs. The propeller shaft housing is thus relieved of longitudinal thrust stresses and of all torsional stresses and the sections thereof are thus free to move longitudinally and/or to rotate to accommodate all possible movements of the rear wheels with respect to the frame.

In view of the foregoing, it will be apparent that one of the principal objects of the invention is to provide engine supporting and vehicle suspension means conjointly cooperative to adequately cope with the peculiar vibration stresses and reactions set up by an engine having horizontal opposed cylinders.

Another object of the invention is to provide a simplified drive between the engine and rear axle, whereby the conventional universal joint between the transmission shaft and propeller shaft and between the transmission housing and the propeller shaft housing may be eliminated.

A further object of the invention is to provide a vehicle suspension adapted for use with a propeller shaft housing mounted rigidly at both ends and capable of transmitting longitudinal thrust and permitting free rotative movement of the rear drive wheels relative to the roadway without placing any torsional stress upon the propeller shaft housing.

A still further object of the invention is to provide a vehicle suspension adapted for use with a propeller shaft housing incapable of transmitting longitudinal thrust but which permits free relative movement of the rear drive wheels with respect to the frame about the axis of said housing.

A further object of the invention is to provide a rotatable joint in a propeller shaft housing.

Another object of the invention is to provide a propeller shaft housing capable of longitudinal adjustment to vary its length.

Still another object of the invention is to provide a resilient support for the front end of an engine.

A further object of the invention is to provide means for restraining an engine supported on the frame only at its forward end from unduly oscillating.

A still further object of the invention is to provide mounting means for pivotally connecting the end of a spring to a rear axle housing.

Other and further objects of the invention will be apparent from the following description taken in connection with the accompanying drawings, in which:

Figure 1 is a diagrammatical plan view of a chassis illustrating one form of the invention in which the engine, transmission, propeller shaft housing, and rear housing are rigidly connected together as a unit, but wherein the propeller shaft housing is made of sections and provided with a rotatable joint capable of transmitting longitudinal thrust and at the same time permitting relative rotary movement of the sections of the propeller shaft housing;

Figure 2 is a longitudinal sectional view taken on the line 2—2 of Figure 1;

Figure 3 is a front elevation of the engine and frame, and particularly illustrating the resilient support for the front of the engine and the mounting bracket provided for limiting the relative rotary or oscillatory movement of the engine with respect to the frame;

Figure 4 is an enlarged sectional view through the rotatable joint of the propeller shaft taken on the line 4—4 of Figure 1;

Figure 5 is a sectional view taken on the line 5—5 of Figure 1 illustrating the fastening means employed for connecting the rear springs to the rear axle housing and frame;

Figure 6 is an enlarged sectional view through the mounting bracket and frame taken on the line 6—6 of Figure 3;

Figure 7 is a perspective view on an upper channel element of the resilient engine support;

Figure 8 is a perspective view of a resilient rubber body employed in the engine support; and Figure 9 is a perspective view of a lower channel element of the engine support, it being understood that these parts are vulcanized together to form a unitary mounting block;

Figure 10 is a perspective view of an engine mounting bracket adapted to cooperate with the engine support and frame to limit oscillatory movement of the engine relative to the frame;

Figure 11 is an enlarged sectional view taken on the line 11—11 of Figure 10 and particularly illustrating a type of resilient abutment means which may be carried by the mounting bracket.

Figure 12 is a view somewhat similar to Figure 2, in partial cross section and illustrating a modified form of rotatable joint for the propeller shaft housing, the joint permitting relative longitudinal and rotary movement of the sections of the propeller shaft housing, but being incapable of transmitting any driving thrust;

Figure 13 illustrates fastening means for rigidly connecting the rear spring to the rear axle housing and frame to transmit thrust through the rear springs to the frame when the propeller shaft housing of Figure 12 is employed;

Figure 14 is a sectional view taken on the line 14—14 of Figure 13, further illustrating details of the spring mounting for the rear axle housing;

Figure 15 illustrates a one-piece bracket which may be welded or otherwise secured to the rear axle housing and used in lieu of the spring mounting means shown in Figure 14; and Figure 16 is an enlarged elevation of part of the transmission and propeller shaft housing, with parts cut away to show an illustrative connection between the transmission shaft and the propeller shaft.

Referring now more particularly to Figures 1, 2 and 3, a vehicle frame is generally indicated by the numeral 1. The frame 1 comprises opposed side members 2, a front transverse member 3, and a rear transverse member 4. It will be understood that any suitable number of intermediate transverse members may be used.

The front end of the frame 1 is supported by semi-elliptical springs 5 which may be secured to said frame by swinging shackles in any conventional manner. The springs 5 may also be fastened to a front axle 6 by any suitable means. The front axle 6 may also be conventionally connected to a pair of front wheels 7.

The rear end of the frame 1 is preferably supported relatively to a rear axle housing 8 by cantilever springs 9. One end of each of the cantilever springs 9 is secured to the side members 2 of the frame by a U-bolt 10 and a machine bolt 11 extending through a flange of the side member 2 and the several leaves of the spring, as best shown in Figure 5. It will be obvious that the springs 9 may consist of any desired number of leaves.

The opposite end of each of the cantilever springs 9 is secured by means of a swinging shackle 12 to the rear axle housing 8. The shackle 12 comprises a pair of spaced shackle plates 13, one end of each of said plates being pivotally supported at 14 upon a lug member 15 welded or otherwise secured to the rear axle housing 8. The opposite end of each pair of shackle plates 13 is pivotally connected at 16 to one end of the spring 9. The pivotal connections at 14 and 16 consist of suitable bolt means and may include conventional rubber bushings which never require lubrication.

The rear axle housing 8 contains suitable axle means 17 connected to rear driving wheels 18.

A two cylinder engine, generally indicated by 20, is resiliently and yieldably supported upon the front transverse member 3 by a special engine support generally designated 22 and which engine and support will be described in more detail hereinafter.

A change speed transmission 24 is rigidly secured to the engine block by cap screws or bolts 26. The transmission 24 is provided with a flange 28 at the end thereof remote from the engine. A propeller shaft housing 30 comprising hollow tubular sections 31 and 32 is adapted to receive a propeller shaft 33 and to be rigidly connected with the transmission 24 and a differential housing 34 associated with the rear axle housing 8. Accordingly, the propeller shaft housing section 31 is provided with a flange 36 adapted to be secured by means of cap screws or bolts 37 to the flange 28 of the transmission 24. Similarly, the section 32 of the propeller shaft housing 30 is provided with a flange 39 adapted to engage a similar flange 41 on the differential housing 34 and to be secured thereto by bolts 43. It will be apparent that any desired number of bolts 37 and 43 may be employed.

The sections 31 and 32 of the propeller shaft housing 30 are connected together by a joint best illustrated in Figure 4. As shown, the section 31 is provided with an externally threaded collar 45 brazed, welded, or otherwise secured thereto at a substantial distance from one end 47 thereof. The section 32 has an internally threaded collar 49 welded or otherwise secured to an end 50 thereof. The length of the propeller shaft housing sections 31 and 32 and the positioning of the collar 45 on the propeller shaft housing section 31 is predetermined so that the collar 45 may be threaded into the collar 49 the desired distance to provide a propeller shaft housing having a given desired dimension from the outer face of the flange 36 to the outer face of the flange 39. Obviously, the threaded collar arrangement provides a propeller shaft housing of adjustable length, within limits, of course.

The propeller shaft housing 30, in addition to being bolted to the rear axle housing, is preferably braced with respect to said rear axle housing by suitable radius rods. To this end, a plate 55 is welded to the underside of the collar 49. The plate 55 has angularly bent extremities 56 each adapted to receive a threaded end 57 of a rigid radius rod 58. The ends 57 of the radius rods 58 are immovably connected with the plate 55 by suitable nuts 59 threaded upon the ends 57. The opposite end 60 of each of the radius rods 58 is also threaded and adapted to be secured to a bracket 61 welded or otherwise fastened to the rear axle housing 8. Nuts 62 are provided for maintaining the radius rods in assembled relation with the bracket 61.

Referring now to Figs. 2 and 16, the propeller shaft housing 33 is interposed between and splined to a transmission shaft housing $24^c$ at $24^x$ and to a differential shaft housing $34^c$ at $34^x$. The end of the propeller shaft housing adjacent the transmission shaft housing is recessed to receive splines $24^y$ on shaft housing $24^c$ and adjacent the end of shaft housing 33 is provided a cavity $33^c$ for washers 63 and $63^a$ and a coil spring 64 adapted to be interposed between said washers. The purpose of the spring 64 is to exert pressure upon one end of the propeller shaft housing 33 to eliminate rattle and undesirable movement of the propeller shaft housing in the splines. A sealing device consisting of a leather member $64^f$ held in a support $64^g$ by a garter spring $64^h$ may be provided adjacent the end of shaft housing 33 in order to retain lubricant within cavity $33^c$. The connection at $34^x$ may be similarly constructed.

In assembling the parts, the splines of the differential and propeller shafts may be interengaged. The propeller shaft housing 30 (assembled and preadjusted for length) may then be slipped over the propeller shaft housing and bolted to the flange 41 of the differential housing 34. The washers 63 and $63^a$ and spring 64 may then be placed in the cavity $33^c$ over shaft $24^c$ and the splines $24^y$ telescoped with complementary grooves on the propeller shaft 33. The bolting of the forward end of the propeller shaft housing to the flange 28 of the transmission 20 will complete this phase of the assembly.

It will be clear from the foregoing that the section 32 of the propeller shaft housing may rotate slightly relative to the section 31 by virtue of the threaded connection therebetween when either the engine tends to rotate slightly, or the relative elevation of one of the rear wheels changes with respect to the other. In this connection, it is pointed out that the pitch of the threads on the propeller shaft housing sections is standard and, while rotation of said sections in normal use may be in a direction which would tend to thread one section into the other, the actual angle of turning is so slight that any shortening of the propeller shaft housing resulting therefrom is infinitesimal and negligible. It will also be apparent that longitudinal thrust can be transmitted through the propeller shaft housing 30 from the rear wheels 18 and rear axle housing 8 to the transmission 24, engine 20, and engine support 22 by virtue of the fact that the sections 31 and 32 of the propeller shaft housing are prevented from moving lengthwise of each other by the threaded connection between said sections. It will further be apparent that the swinging spring shackles 12 will permit relative movement of the frame 1 with respect to the roadway without placing any tensional stresses upon the sections 31 and 32 of the propeller shaft housing 30.

The resilient engine support 22 previously referred to is best illustrated in Figures 3 and 6 to 9, inclusive, and upon reference to Figure 6 it will be seen that the front transverse member 3 of the frame 1 is provided with a central depressed portion 65. The resilient support 22 is positioned substantially midway of the transverse member 3 and comprises a channel member 66 apertured at 67 and adapted to be secured by bolts 68 to said transverse member. A block of rubber 69 is vulcanized in the channel member 66 and a second channel member 70 is vulcanized in the upper portion of said rubber block. The channel member 70 has side portions 71 which increase in height from their ends toward the mid portion thereof.

An engine mounting bracket 75, which may be formed of heavy gauge sheet steel, is bolted to a flange 76 depending from the engine block 20. A vertical web 77 of the bracket 75 is apertured for the passage of bolts 78 for securing said bracket to said depending flange. A horizontal web 79 of the bracket 75 has end portions 80 bent at an angle of approximately 37 degrees from the horizontal so as to be substantially parallel with the adjacent upper face of the transverse frame member 3. The inclined portions 80 of the bracket are apertured at 81 (see Figure 12) to receive rubber buttons 82 which are adapted to engage with the transverse frame member 3 to limit relative oscillation of the motor with respect to the frame. The rubber buttons 82 are provided with stems 83, each adapted to be received and retained under compression in the aperture 81 formed in the angular portions 80 of the bracket.

The horizontal web 79 of the bracket member 75 is provided with apertures 85 adapted to register with apertures 86 in the ends of the channel member 70. Bolts 88 pass through the apertures in these members respectively for securing the same together. It will be clear from Figures 3 and 6 that the weight of the front end of the engine 20 is borne by the rubber block 69 and that, with the parts proportioned as shown, the engine is always resiliently supported against vibration with respect to the frame.

It will be understood that we may modify the mounting structure above described in various ways such as making the flange 76 horizontal and securing it to the horizontal web 79 of bracket member 75.

Figures 1 and 3 diagrammatically illustrate the arrangement of the cylinders, pistons and crankshaft of the engine 20. Thus, the engine 20 is provided with two cylinder bores 90, each of which contains a piston 91. The pistons 91 are connected by connecting rods 92 to a crankshaft 93, the cranks of the shaft being disposed 180° apart so that the cylinders 90 are horizontal as shown in Figure 3 and the axes thereof are only slightly offset as shown in Figure 1. This type of engine, as has been pointed out above, has presented new problems in mounting when used in an automobile.

Referring now to Figures 12 to 14, inclusive, a propeller shaft housing 30a is shown comprising hollow tubular sections 31a and 32a arranged in telescoping relation about a propeller shaft 33a. The section 31a is of such external diameter as to snugly fit and slide in the section 32a without producing any vibration or rattle. At the same time, the section 31a may turn with respect to the section 32a to accommodate such relative rotative movement between the wheels and the transmission as might be required by road conditions or movement of the frame relative to the roadway.

The propeller shaft housing section 31a is provided with a flange 36a bolted to a flange 28a formed on a transmission casing 24a. Similarly, the section 32a is provided with a flange 39a bolted to a flange 41a formed upon a differential housing 34a.

Inasmuch as the sections 31a and 32a are adapted to move longitudinally relatively to each other, it is desirable to prevent the entry of dirt or foreign matter between the sections to avoid binding or interference with their free movement. Accordingly, a flexible boot 96 made of rubber or other suitable material is positioned to overlie the juncture of the two sections and is secured to both sections by suitable clamps 97.

The propeller shaft 33a is connected with the transmission and differential in the same manner explained in connection with the shaft 33.

In order to transmit driving thrust from the rear wheels to the frame of a vehicle provided with a propeller shaft housing of the type shown in Figure 12, means is provided whereby such thrust may be directly transmitted from the rear axle housing to the frame through the rear springs. Structure for accomplishing the above is illustrated in Figure 13. In this form, a spring 9a similar to the spring 9 may be employed and likewise secured to a side member 2a of the frame 1a. A rear axle housing 8a corresponding to the housing 8 described hereinbefore may be used without modification, but as a substitute for the free swinging shackles 12, a plurality of adapter plates 13a are provided; the adapter plates being disposed upon opposite sides of a lug 15a and being secured thereto by bolt means 14a. One end of the spring 9a may be pivotally secured by a similar bolt means 16a to a lower portion of the adapter plates 13a. In order to prevent relative rotation of the adapter plates 13a with respect to the rear axle housing 8a, the adapter plates are provided with a notch 13b which snugly fits about the axle housing 8a. The shape of the notch 13b is such as to preclude the adapter plates 13a from rotating relatively to the housing 8a on the bolt means 14a. The opposite end of the spring 9a is secured by a U-bolt 10a and a machine bolt 11a to the side frame member 2a. It will therefore be clear that the driving thrust of a rear wheel 18a will be transmitted through the rear axle housing 8a and the spring 9a directly to the frame 1a of the vehicle.

A modified form of connector for the spring 9a is illustrated in Figure 15. The connector here takes the form of a one-piece bracket 100 having a portion 101 encircling a rear axle housing 8ᵇ. The portion 101 of the bracket may be welded or otherwise secured to the housing 8ᵇ in order to nonrotatably fix the same thereto. The bracket 100 is further provided with ears 102 each having an aperture 103 adapted to receive any suitable pivot means for securing one end of the spring 9ᵃ thereto.

In either of the exemplary embodiments above described it will be noted that the engine, transmission, propeller shaft housing and rear axle housing are firmly connected together as against transverse bending stresses and that the entire assembly tends to pivot about the mounting or support 22 when both front wheels of the vehicle assume a different elevation from both rear wheels. However, when a wheel on one side assumes a different elevation from a wheel on the opposite side, the front or rear pair of wheels tend to rotate around the rotative joint between the housing sections.

It will be understood that the specific structure shown herein for accomplishing the purposes of the invention may be varied without departing from the spirit of the invention.

We claim:

1. A motor vehicle construction comprising an engine; a frame having a front transverse member; resilient means supporting one end of said engine upon the medial portion of said front transverse member; a transmission, a propeller shaft housing, and a rear axle housing securely interconnected with each other and to said engine, said propeller shaft housing including a plurality of sections arranged to turn with respect to each other; springs secured to said frame near the rear end thereof; and means pivotally connecting each of said springs with the rear axle housing.

2. A motor vehicle construction comprising a two-cylinder engine having horizontally opposed cylinders; a frame having a front transverse member; resilient means supporting one end of said engine upon said front transverse member; a transmission, a propeller shaft housing, and a rear axle housing all interconnected with said engine; said propeller shaft housing including a plurality of sections with a joint between said sections arranged to allow relative turning of said sections but no relative longitudinal movement thereof; springs carried by said frame near the rear end thereof; and a free swinging shackle interconnecting each of said springs with the rear axle housing, whereby driving thrust may be transmitted through said propeller shaft housing to said frame.

3. A motor vehicle construction comprising an engine having horizontally opposed cylinders; a frame having a front transverse member; resilient means supporting one end of said engine upon said front transverse member; a transmission, a propeller shaft housing, and a rear axle housing interconnected with said engine, said propeller shaft housing comprising two sections arranged for relative rotary and longitudinal movement; springs disposed near the rear end of said frame; means fixedly securing one end of each of said springs to said frame; and means including a fixed pivot connecting each of said springs with the rear axle housing, whereby driving thrust may be directly transmitted through said springs to said frame.

4. In a motor vehicle construction, a frame having a transverse member; a rigid unitary structure comprising an engine, a transmission secured to said engine, said transmission having a flange, a sectional propeller shaft housing having flanges at opposite ends thereof, one end of said propeller shaft housing being secured to the flange of said transmission, a rear axle housing having a flange, the opposite end of said propeller shaft housing being secured to the flange of said rear axle housing, a differential shaft associated with said rear axle housing, and a joint intermediate the ends of said propeller shaft housing for permitting the sections thereof to rotate relatively to each other; a propeller shaft in said propeller shaft housing for transmitting driving torque from said transmission to said differential shaft; means resiliently supporting said engine upon said transverse member; and resilient means interposed between said rear axle housing and said frame.

POWEL CROSLEY, Jr.
LOUIS C. OSWALD.